May 1, 1934.  W. H. DANIELS ET AL  1,957,421
MOLDING PRESS
Filed Jan. 23, 1931  5 Sheets-Sheet 5
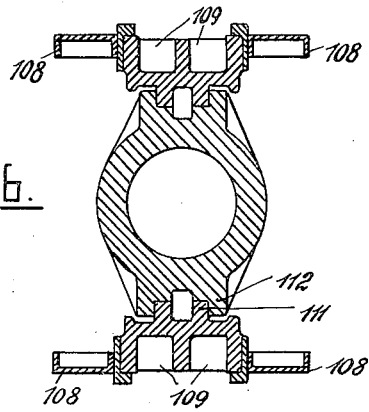
FIG.6.
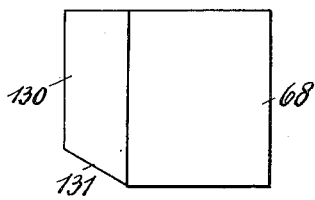
FIG.8.  FIG.7.
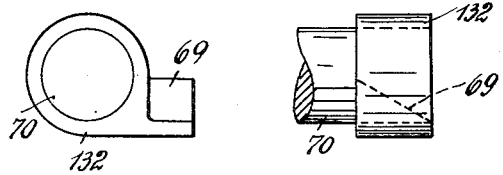
FIG.9.
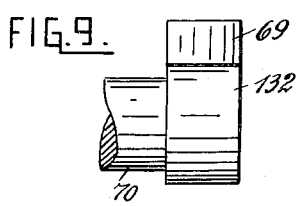
*Inventors:*
*Wilhelm Heinrich Daniels*
*and Josef Daniels*
*by Henry Loo Clarke*
*Atty.*

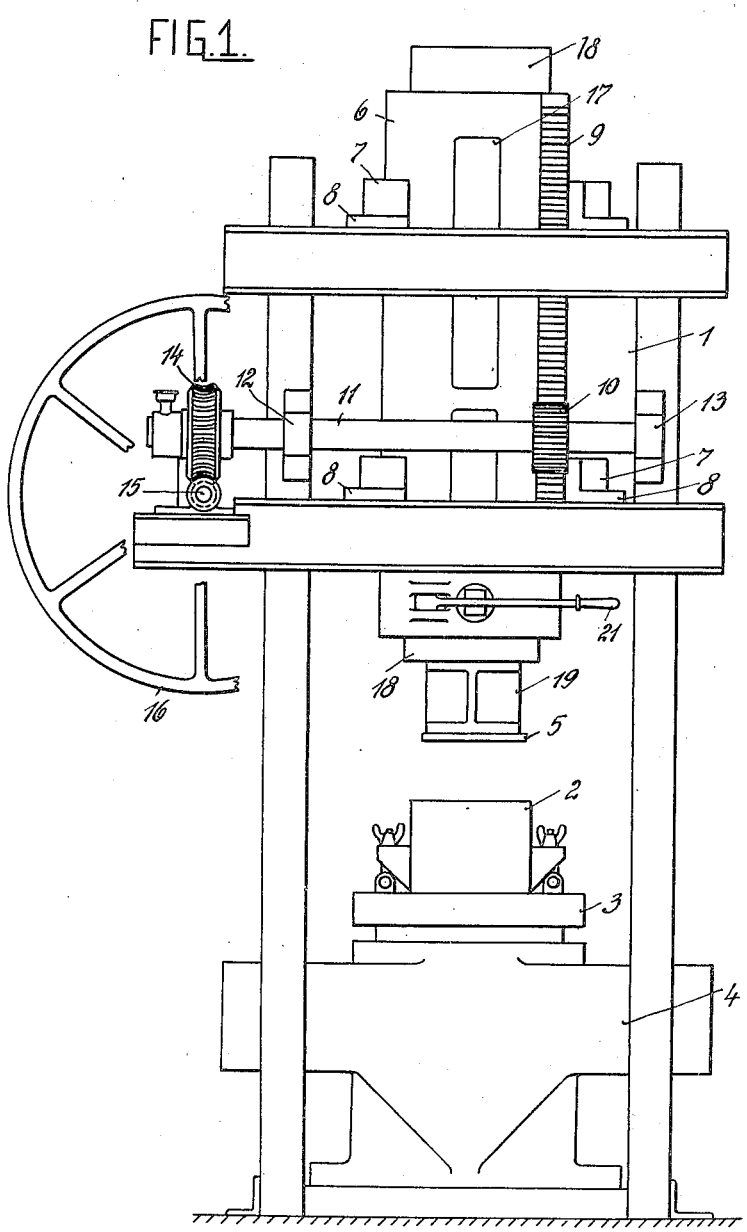

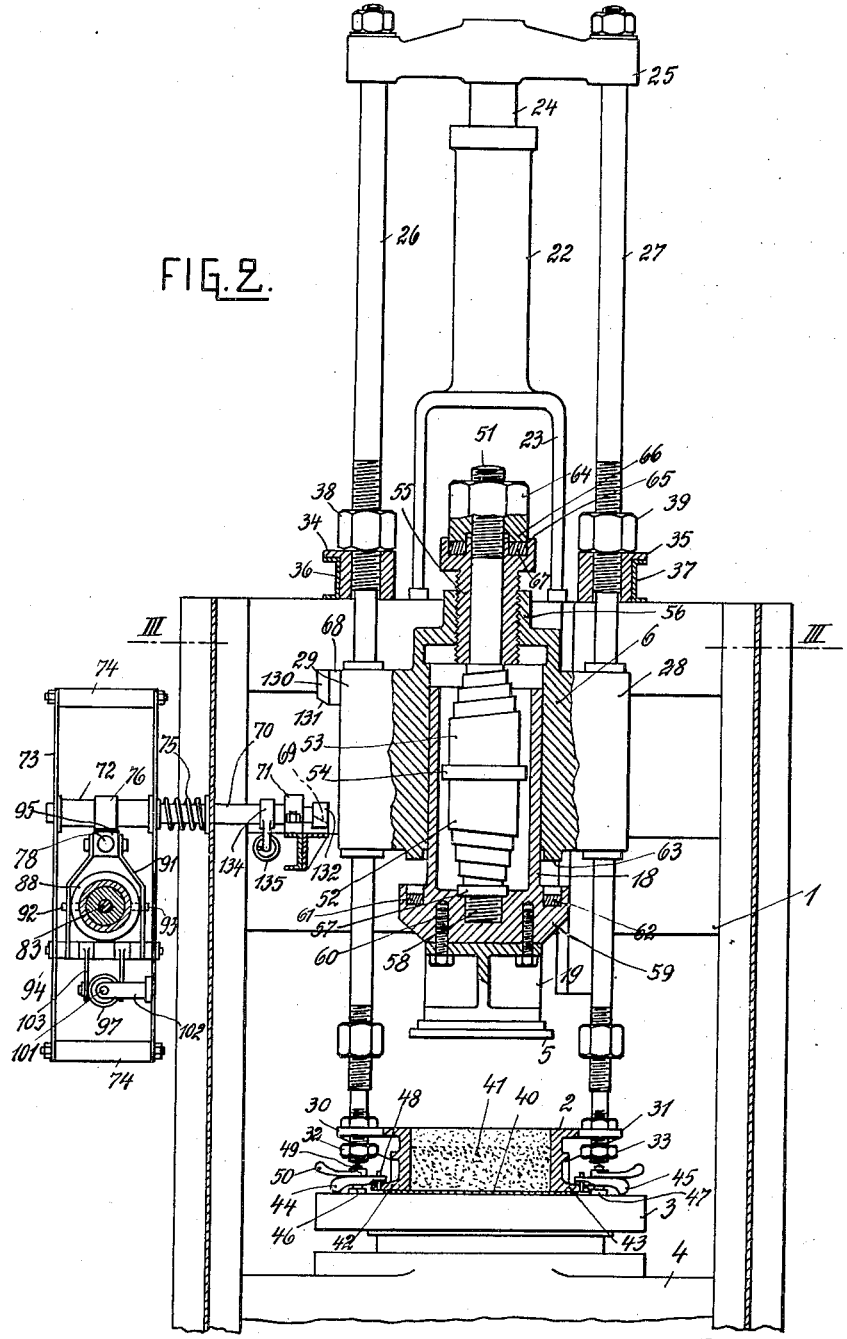

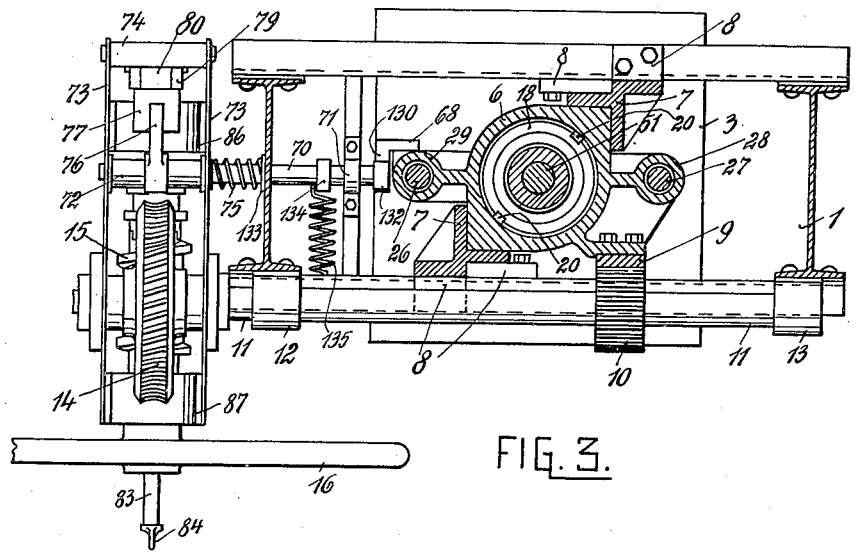

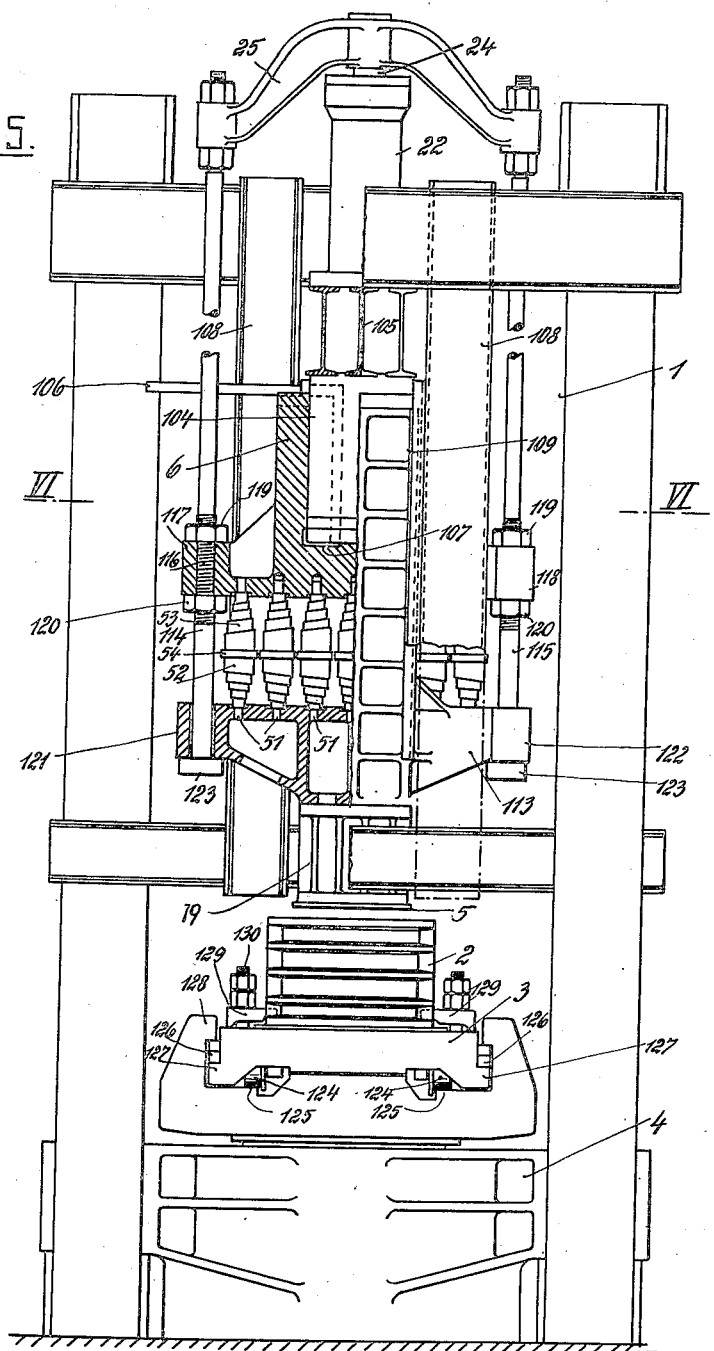

Patented May 1, 1934

1,957,421

UNITED STATES PATENT OFFICE 1,957,421

MOLDING PRESS

Wilhelm Heinrich Daniels, Dusseldorf-Heerdt, and Josef Daniels, Essen-Ruhr, Germany, assignors, by mesne assignments, to The Koppers Company of Delaware, Pittsburgh, Pa., a corporation of Delaware Application January 23, 1931, Serial No. 510,790
In Germany January 27, 1930

2 Claims. (Cl. 25—84)

Our invention relates to molding presses and is particularly directed to molding presses combined with a jarring device for use in the manufacture of artificial stones, refractory bricks and similar products.

In presses of the kind described the material is compressed in the mold by the combined action of the ramming device which is placed on top of the material, and a jarring device.

It is an object of our invention to improve a machine of this type. To this end we subdivide the ramming device into the ram proper which is arranged to be displaced vertically on the frame of the machine, and a support for the mold plate which is carried by and arranged to be displaced with respect to the ram.

In jarring molding presses as heretofore designed the stroke of the ram with respect to the mold is practically invariable which involves the drawback that in such machines only articles of a predetermined, substantially constant height can be molded. If the height is less than the normal, the distance of the mold plate from the ram guiding means becomes so large that edging of the ram is inevitable, that is, the ram tends to move the mold plate toward the edge of the mold during pressing in the mold. This is particularly inconvenient if articles are molded the centre of gravity of which is eccentric, such as for instance blocks for curved surfaces and if it is desired that the articles should have exactly horizontal or stepped upper faces.

Another disadvantage of the presses as heretofore designed is that it is difficult or even impossible to load the mold plates to the extent required for certain manufactures, for instance the manufacture of refractory bricks, because the stress on the guides is greatly increased by a heavily loaded mold plate and the tendency to edging increases in proportion.

By providing a ram in combination with a mold-plate support according to our invention, we obtain a particularly suitable jarring molding press for the manufacture of artificial stones of any type, such as refractory bricks, curved blocks of various heights and the like.

The support acts on the mold plate as a weight and is guided practically over its entire length on the ram which in turn is guided on the frame of the machine.

In a preferred embodiment of our invention the ram is designed as a sort of jacket in which the support makes a sliding fit, and means are provided for holding the ram in a fixed position on the frame during the operation of the jarring device.

By these means a more rugged design of the combined molding press and jarring device is obtained. The ram is moved as near to the mold as practicable in conformity with the height of the article to be molded and is then anchored on the frame of the machine. The ram which forms the guide for the mold-plate support, is thus fixed a short distance above the mold, and the unguided length of the mold-plate support is reduced to a minimum. Obviously the means for guiding the support in the ram must be so designed as not to interfere with the longitudinal displacement of the support in the ram.

It will be understood that in a press of the kind described highly compressed blanks for refractory bricks and other articles of various heights may be produced without requiring any alterations of the press, while at the same time the compression of the blanks by the combined action of pressure and jarring is much more effective than in the normal molding presses of equal size and equal initial cost. Difficulties involved by eccentric, stepped or other irregular articles are eliminated and the articles do not require any subsequent finishing, as in the old machines.

Springs may be inserted between the ram and the mold-plate support which not only permit exerting higher pressure but also gradual increasing of the pressure, and prevent chattering of the molding plate on the blank as the inertia forces arising during the upward strokes of the jarring device are absorbed by the springs. Besides the time available for the articles to settle is extended throughout the duration of the process as the mold plate is permanently applied under resilient pressure.

In the drawings affixed to this specification and forming part thereof hand-operated presses and a hydraulic press embodying our invention are illustrated diagrammatically by way of example.

In the drawings

Fig. 1 is an elevation of a hand-operated press having a ram and a mold-plate support which is guided in the ram, no springs being provided, Fig. 2 is a partly sectional elevation, drawn to a larger scale, of the upper portion of a press, also hand-operated, in which springs are interposed between the ram and the mold-plate support, Fig. 3 is a section on the line III—III in Fig. 2, Fig. 4 is an end elevation showing a portion of the machine, viewed from the left in Fig. 2, Fig. 5 is a partly sectional elevation of a hydraulic machine, Fig. 6 is a section on the line VI—VI in Fig. 5, and Figs. 7, 8 and 9 are details showing a control of the machine illustrated in Figs. 2–4.

Referring to the drawings, in all the figures 1 is the frame of the press which, as best seen in Fig. 3, is built up from vertical I-sections and horizontal channel sections, but might obviously be designed in any other suitable manner. 2 is the mold, 3 is a table, on which the mold is secured, 4 is a jarring device of any known kind, which need not be described in detail, and 5 is the mold plate which is adapted to enter the mold 2 and to compress the article therein.

Referring more particularly to Figs. 1, 2 and 3, 6 is a ram which is mounted to slide in suitable angular blocks 7 which are supported on the horizontal channel sections of the frame 1 by flanges 8. As best seen in Fig. 3, the ram 6 is substantially cylindrical and provided with diametrally opposite sides with two pairs of guide faces which fit the blocks 7. Obviously the ram may be designed in any other suitable manner. It may for instance be of square or rectangular cross-section, and four pairs of guide blocks may be provided instead of two.

The ram is displaced by a rack 9 and a pinion 10 which meshes with the rack and is keyed on a shaft 11. 12 and 13 are bearings on the flanges of the vertical I-sections in which the shaft 11 is mounted to rotate, 14 is a worm wheel on the shaft, 15 is a worm which meshes with the worm wheel and is mounted to rotate in suitable bearings on one of the horizontal channel sections, and 16 is a hand wheel for rotating the worm 15.

Mounted to slide in the ram 6, which may be recessed at 17 (Fig. 1) for reducing its weight, is a support 18, to the lower end of which the mold plate 5 is attached by a suitable fitting 19. Means such as splines 20 (Fig. 3) may be provided for preventing rotation of the support if it is cylindrical as shown. Means are provided for positively connecting the ram 6 and the support 18 and such means, as shown in Fig. 1, may be a catch or clutch which is mounted to slide in the block 6 and is adapted to be controlled by a handle 21.

In operation the mold 2 is filled with the material to be molded, the ram together with the support 18 which is connected to the ram by the catch or clutch under the control of lever 21, is lowered until the mold plate 5 rests on the material, the catch is then thrown out so that the weight of the support 18 bears on the material in the mold, and the mold is jarred. It will be understood that the lower end of ram 6 extends nearly down to the mold so that the support 18 is guided practically throughout its length upwardly of the mold and edging and other irregularities are avoided. When the jarring operation has been completed, the clutch is thrown in by the lever 21 and the support with the mold plate 5 is lifted free of the mold. The molded article can now be removed.

Referring now to Figs. 2, 3 and 4, these illustrate the upper portion of a more elaborate press in which springs are provided for increasing the load on the molded article beyond the weight of the mold-plate support. Furthermore, means are provided for drawing the mold off the finished article while it is being held down by the mold plate 5 at the lower end of the support.

For stripping we provide a hydraulic cylinder 22 which is secured on the frame of the machine by a suitable, preferably open bracket 23. 24 is a plunger which is mounted to slide in the cylinder 22, and 25 is a cross-head at the other end of the plunger. 26 and 27 are rods inserted in suitable eyes at both ends of the cross-head which extend downwardly through bores in lugs 28 and 29 on both sides of the ram 6. The lower ends of the rods 26 and 27 are inserted in eyes 30 and 31 of the mold 2 and are provided with nuts 32 and 33 engaging below the eyes.

34 and 35 are nuts on threaded portions of the rods 26 and 27 at the level of the upper channel sections of frame 1, and 36 and 37 are channel sections which are supported on the upper channel sections, the nuts being recessed for the reception of the sections, so that the weights suspended on the rods 26 and 27 are supported on the frame. 38 and 39 are lock nuts for the respective recessed nuts 34 and 35.

40 is a mold board on the table 3, on which the mold 2 and the article 41 in the mold are supported, 42 and 43 are flanges at the lower end of the mold, and 44 and 45 are turn buttons which are mounted to turn on pins 46 and 47, and are adapted to engage the flanges 42 and 43, respectively. Each turn button is equipped at its inner end with a pin 48 which is adapted to enter a slot in the corresponding flange so that the mold is centered. A nut 49 secured on the upper end of each pin 46 and 47 is equipped with a handle 50 for locking the turn button 44 on its pin.

The support 18 is a hollow cylinder with a central rod 51 on which are secured springs 52 and 53. The springs are separated by a collar 54 on the rod 51. The upper spring 53 is abutted against a threaded sleeve 55 which is inserted in a corresponding sleeve 56 at the upper end of the ram 6. The lower spring 52 is abutted on a collar 57 at the lower end of the rod 51 which is threaded at 58 and inserted in the base plate 59 of the supoprt 18. 60 are screws by means of which the fitting 19 is secured to the base plate 59. 61 is an annular recess in the upper face of the base plate 59, and 62 is an insertion of resilient material, such as rubber, in the recess. 63 is a spigot which extends downwardly from the lower face of the ram 6 and is adapted to enter the recess 61. Similar means are provided intermediate the upper end of the sleeve 55 and a nut 64 on the upper end of the rod 51. The sleeve 55 is recessed by its upper end 65, the recess is adapted to be entered by a spigot 66 at the lower end of nut 64, and 67 is an insertion of resilient material in the recess of the sleeve 55. In this press a permanent connection between the ram 6 and the mold plate support 18 is established by the springs 52 and 53, and therefore the catch controlled by the lever 21, (Fig. 1) is dispensed with here.

The means for raising and lowering the ram 6 are designed as described with reference to Fig. 1, but are combined with automatic means for throwing out the mechanism for raising and lowering the ram 6 under certain conditions, as will be described.

68 is a dog which is adjustably secured to the lug 29 of the ram 6. The dog, as best seen in Fig. 7, is L-shaped in plan and provided with an inwardly projecting rib 130, with a cam face 131 at its lower end which is adapted to cooperate with a cam face 69 at one end of a short arm 132, and 70 is a shaft on which the short arm is secured at its inner end. 71 is a bearing for supporting the inner end of the shaft and 72 is a bearing for supporting its outer end. The bearing 72 is fixed in an auxiliary frame at the right of the main frame 1, 73, 73 being the two end plates of the frame and 74 being stays and spacing sleeves for connecting the end plates. In Fig. 4 the outer end plate 73 has been omitted to show the parts within the auxiliary frame. The shaft 70 is mounted in its bearings 71 and 72 for rotation and axial displacement. 75 is a spring which is mounted on the shaft intermediate the inner end plate 73 of the auxiliary frame and the I-section at the right of the main frame 1. 133 is a collar on the shaft 70 which bears against the spring 75 so that the spring is compressed when the shaft is moved to the right by the cooperation of the cam faces 131 and 132.

The bearing 72 is divided. 76 is a pawl which is inserted between the parts of the bearing and splined on the shaft 72 so that it will not interfere with the axial displacement of the shaft, but will partake in its rotation. 77 is a block on a bar 78. This block is provided with a recess for the hook-shaped free end of the pawl 76 to engage in, as can best be seen in Fig. 4. 134 is an arm on the shaft 70 and 135 is a spring which is anchored in the lower horizontal channel section of the main frame 1 and tends to throw the pawl 76 into the recess of the block 77. 79 is a forked double-armed lever which is fulcrumed in the auxiliary frame at 80. 81 is a pin connecting the outer end of the bar 78 to the lever 79, 82 is a pin at the lower end of the lever 79, and 83 is a rod with a handle 84 at its outer end which is mounted to slide in the hollow shaft 85 of the hand wheel 16. The shaft 85 is mounted to rotate in bearings 86 and 87 near the ends of the auxiliary frame 73. 88 is a neck ring which is splined on the shaft 85, 89 is a serrated clutch member on the ring 88, and 90 is the mating serrated member on the boss of the worm 15, the worm being free to rotate on the shaft 85, but being held against axial displacement by its engagement with the worm wheel 14. 91 is a clutching lever which, as will appear from Fig. 2, is forked to surround the neck ring 88 to which it is connected by pins 92 and 93. The clutching lever 91 is fulcrumed in the auxiliary frame 23 at 94 and at its upper end is connected to a boss 95 which slides on the bar 78. 96 is a spring which is inserted between the boss 95 and the block 77, and 97 is a spring which at one end 98 engages a pin 99 at the lower end of lever 91 and at the other end 100 is secured to a threaded pin 101 in a threaded lug 102 on the frame 73. The pin 99 is held in two arms 91 projecting downwardly beyond the pivot 93 of the lever 91.

The spring 96 on the bar 78 is under tension, when the block 77 is arrested by the pawl 76, and holds the clutch 89, 90 thrown in against the action of the spring 97 which tends to throw out the clutch. Normally, as the block 77 is held by the pawl 76, the clutch is thrown in by the spring 96 and when the hand wheel 16 is rotated, the hollow shaft 85 rotates the clutch part 89 and the worm 15. The handle 84 of rod 83 is pulled out and the parts are in the position illustrated in Fig. 4. By rotating the hand wheel 16 the ram 6 is lowered until the mold plate 5 rests on the material 41 in the mold 2. Upon further rotation of the hand wheel the material is compressed and the springs 52 and 53 are also compressed by its reaction. Unsprung engagement of the ram 6 and the support 18 is prevented by the buffer 62 below the spigot 63. The buffer 67 serves a similar purpose for the nut 64 and the sleeve 55.

The dog 68 is adjusted on the lug 29 in conformity with the height of the article in the mold 2. Near the lower end of the ram stroke the cam face 131 at the rib 130 strikes the cam face 69 on the arm 132, and, rotation of the shaft 70 being prevented by the engagement of the pawl 76 with the block 77, the shaft 70 is shifted to the left in Fig. 2, compressing spring 75. The shifting of the shaft is permitted by its splined connection with the pawl 76. When the dog 68 has moved past the shaft 70, the shaft is returned into its initial position by the spring 75 and the arm 132 is now ready to be engaged by the upper face of the rib 130, when the ram 6 starts for its return stroke. The hand wheel 16 is reversed and the ram 6 is raised until the springs 52 and 53 have lost their tension. At this instant the rib 130 of the dog 68 engages below the arm 132, rotating the shaft clockwise and disengaging the pawl 76 from the block 77. The block 77 is now released and the spring 96 looses its tension, the spring 97 prevails and throws out the clutch, so that the ram 6 cannot be moved further and the mold plate 5 remains on the article in the mold 2. The rod 84 is moved inwardly by the lever 79.

The turn buttons 44 and 45 are now operated to release the flanges 42 and 43 at the base of the mold, and liquid under pressure is admitted to the hydraulic cylinder 22. The piston 24 rises and through the medium of the rods 26 and 27 strips the mold 2 from the article which is retained by the mold plate 5. When the mold has been stripped, the rod 84 is pulled out. This causes the bar 78 to be moved to the right in Fig. 4, until the pawl 76 under the action of the spring 135 reengages the recess in the block 77, and the tension of the spring 96 throws in the clutch 89, 90. The finished article is now removed on the board 40 and the press is ready for another cycle of operations.

The presses described with reference to Figs. 1-4 and 7-9 are designed for hand operation and for the molding of comparatively small articles. A machine for the manufacture of very large products will now be described which is operated throughout by hydraulic means, pressure being transmitted from the ram 6 to the support for the mold plate 5 by springs such as 52 and 53 (Fig. 2). By these means the load on the molding plate 5 is regulated to any desired amount by mechanical means and the load may be made so high that the jarring device 4 is under the control of the load, performing only slight vibrations under the load. In this case the machine acts as a "jarring press", compression being principally effected by the hydraulic means aforesaid, while the jarring serves for facilitating the escape of air from the mold. In a press which is operated on this principle, the undesirable overjarring which often occurs in the old machines with weighted mold plates, is absolutely prevented and the products are free from cracks notwithstanding the high pressure to which they have been subjected.

Referring now to Fig. 5, the frame 1, the mold 2, the table 3 and the jarring device 4 are provided as described with reference to the other figures, but in this instance the ram 6 is designed at its upper end as the cylinder of a hydraulic press. 104 is the plunger in the hydraulic cylinder and 105 are I-sections by means of which the plunger is suspended from the upper pair of horizontal channel sections. By these means the plunger 104 is held in a fixed position, while the ram 6 is displaced, if liquid is admitted to the space below the plunger through a pipe 106 and a passage 107. As this press is heavier than the presses previously described, four vertical channel sections 108 are provided for guiding its ram. 109 are slide bars which are inserted between the two channel sections 108 at both sides of the frame 1, each being equipped with an inwardly projecting rib 111 which is engaged by a pair of lugs 112 on the ram 6.

The support 18 is replaced by a bracket 113, which is mounted to slide on rods 114 and 115. The rods are threaded, as shown at 116 for the rod 114, and held in lugs 117 and 118 of the ram 6 by upper and lower nuts 119 and 120. Mounted to slide on the lower end of the rods are lugs 121 and 122 at the sides of the bracket 113, and heads 123 are provided at the lower ends of the rods for limiting the downward displacement of the bracket 113 with respect to the ram 6. The fitting 19 with the mold plate 5 is secured to the lower end of the bracket.

Rods 51 with springs 52 and 53 and collars 54, as described with reference to Fig. 2, are inserted between the ram 6 and the bracket 113. In view of the great weight of the press a central rod 51 and three rods at both sides are provided, seven in all, each with two springs 52, 53.

The upper ends of the rods 114 and 115 are secured to the cross-head 25 which, as already described, is operated by the piston 24 in the cylinder 23. In the present instance, however, the cylinder 22 is provided for retracting the bracket 113 with the mold plate 5 and not for stripping the mold 2 from the article, as in Fig. 2.

The mold table 3 is equipped with wheels 124 to run on a track 125 which is secured to the jarring device 4. The table 3 may be supported on the wheels 124 by springs (not shown). 126 are wedges which are adapted to be driven in between lugs 127 on the table 3 and 128 on the body of the track 125. The mold is held down on the table by clamps 129 engaging its plungers and by nuts 113.

In operation liquid under pressure is admitted below the fixed plunger 104, causing the ram 6 to descend and to compress the set of springs 152, 153. When the article in the mold 2 has been finished under the action of the hydraulic pressure in the cylinder of the ram, the support or bracket 113 is retracted by the hydraulic piston 24 in the cylinder 22 and the rods 114, 115, and the mold is now free to be run out.

We wish it to be understood that we do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

We claim:

1. A molding press comprising a frame, a mold on said frame, a ram, means for guiding said ram on said frame, means for displacing said ram including a clutch, a shaft mounted to be shifted and to be rotated in said frame, a pawl on said shaft, a bar operatively connected to said clutch, means on said bar for throwing in said clutch, a block on said bar adapted to be arrested by said pawl on said shaft, an arm on said shaft, a dog on said ram adapted to turn said arm, camming faces on said dog and said arm for shifting said shaft without said arm being turned by said dog, means for returning said shaft to its initial position after it has been shifted by said dog, means under the control of said bar for throwing out said clutch after said pawl has released said block, a support carried by and adapted to be displaced with respect to said ram, and a mold plate on said support.

2. A molding press comprising a frame, a mold on said frame, a ram, means for guiding said ram on said frame, means for displacing said ram including a clutch, a shaft mounted to be shifted and to be rotated in said frame, a pawl on said shaft, a bar operatively connected to said clutch, means on said bar for throwing in said clutch, a block on said bar adapted to be arrested by said pawl, on said shaft, an arm on said shaft, an adjustable dog on said ram adapted to turn said arm, camming faces on said dog and said arm for shifting said shaft without said arm being turned by said dog, means for returning said shaft to its initial position after it has been shifted by said dog, means under the control of said bar for throwing out said clutch after said pawl has released said block, a support carried by and adapted to be displaced with respect to said ram, and a mold plate on said support.

WILHELM HEINRICH DANIELS.
JOSEF DANIELS.